United States Patent [19]

Matsuzaki et al.

[11] Patent Number: 4,896,209
[45] Date of Patent: Jan. 23, 1990

[54] PASSENGER VEHICLE POLLING SYSTEM HAVING A CENTRAL UNIT FOR POLLING PASSENGER SEAT TERMINAL UNITS

[75] Inventors: Atsushi Matsuzaki, Kanagawa; Koichi Tagawa, Tokyo; Masami Yamashita, Kanagawa; Yoshiyuki Kondo, Tokyo, all of Japan

[73] Assignee: Sony Corporation, Tokyo, Japan

[21] Appl. No.: 148,590

[22] Filed: Jan. 26, 1988

[30] Foreign Application Priority Data

Feb. 10, 1987 [JP] Japan .................................. 62-29353
Mar. 4, 1987 [JP] Japan .................................. 62-49818

[51] Int. Cl.$^4$ ............................................. H04N 7/00
[52] U.S. Cl. ......................................... 358/86; 358/93; 358/254; 455/3; 340/825.08
[58] Field of Search ................... 358/86, 93, 108, 254, 358/255; 297/146, 161, 191; 340/988, 995, 996, 825.07, 825.08, 825.36, 825.49, 311.1, 313; 455/3-6; 364/424.01, 424.04, 424.05, 424.06

[56] References Cited

U.S. PATENT DOCUMENTS

| | | |
|---|---|---|
| 3,602,891 | 8/1971 | Clark et al. . |
| 3,757,225 | 9/1973 | Ulicki . |
| 3,997,718 | 12/1976 | Ricketts et al. . |
| 4,247,106 | 1/1981 | Jeffers et al. . |
| 4,428,078 | 1/1984 | Kuo . |
| 4,513,315 | 4/1985 | Dekker et al. . |
| 4,521,021 | 6/1985 | Dixon . |
| 4,554,579 | 11/1985 | Citta . |
| 4,573,072 | 2/1986 | Freeman ............................ 358/86 |
| 4,584,603 | 4/1986 | Harrison . |
| 4,591,906 | 5/1986 | Morales-Garza et al. . |
| 4,647,980 | 3/1987 | Steventon et al. . |
| 4,667,193 | 5/1987 | Cotie .............................. 358/825.08 |
| 4,684,981 | 8/1987 | Toyoshima et al. . |
| 4,686,619 | 8/1987 | O'Brien ........................... 358/825.08 |

FOREIGN PATENT DOCUMENTS

| | | |
|---|---|---|
| 103438 | 3/1984 | . |
| 144770A | 6/1985 | . |
| 54-105499 | 7/1979 | Japan . |
| 57-199369 | 12/1982 | Japan . |
| 59-15387 | 1/1984 | Japan . |
| 59-15388 | 1/1984 | Japan . |

OTHER PUBLICATIONS

"Design Technique for Multiplexing Asynchronous Digital Video and Audio Signal," by J. H. Stott, IEEE Transactions on Communications, vol. COM-26, No. 5, May, 1978.
Boeing Electronics Company brochure entitled "Putting the Future of Passenger Services and Entertainment at your Fingertips," 1987, six pages.
Boeing, "Processings of the SCAR Conference, Part 2," Mar., 1977, pp. 854 and 864.

Primary Examiner—Tommy P. Chin

[57] ABSTRACT

A passenger vehicle polling system. The system is capable of polling one or more terminal units, where each terminal unit is provided at a different one of a plurality of passenger seats in a passenger vehicle, to obtain information indicative of the state of each terminal unit. The polling is accomplished by transmitting a polling command signal from a head end apparatus through a transmission line to the terminal units. Preferably, a sensor is mounted adjacent each passenger seat to sense the status of the passenger seat. The sensed information is transmitted as a polling answer signal through the transmission line to the head end apparatus so that the status of each passenger seat and the condition of each passenger can be checked from the head end apparatus. Further, a system according to the invention may transmit audio and video programs to the terminal units, and the polling answer signal may indicate which audio or video program has been selected at each terminal unit.

23 Claims, 8 Drawing Sheets

PASSENGER VEHICLE POLLING SYSTEM HAVING A CENTRAL UNIT FOR POLLING PASSENGER SEAT TERMINAL UNITS

FIELD OF THE INVENTION

The present invention relates generally to polling systems and more particularly to polling systems for use with passenger vehicles having a plurality of passenger seats.

DESCRIPTION OF THE PRIOR ART

As is disclosed, for example, in U.S. Pat. No. 4,584,603, issued Apr. 22, 1986 to Harrison, it has been proposed that audio/video system terminals be separately mounted on passenger seats of a passenger vehicle, such as an aircraft, to entertain passengers during long duration flights. Conventional aircraft have also been equipped with service systems including reading lamps, and attendant call lamps or the like, for meeting various requests of the passengers.

However, in such conventional systems, when the crew were in the crew cabin, they could not know the status of the passenger seats and the condition of each passenger. Accordingly, when the aircraft took off or landed, the passenger attendants had to walk about within the passenger cabin in order to confirm whether the passengers were seated, whether the passenger seats were returned to the upright position from the reclined position, whether the passengers had fastened seat belts correctly or not, and so on.

Further, in conventional systems, it was impossible for the crew in the crew cabin to know which video or audio program had been selected at each terminal.

SUMMARY OF THE INVENTION

The invention is an improved passenger vehicle polling system. When embodied in a passenger vehicle having a plurality of passenger seats, the invention alleviates the labor of the passenger attendants, and provides a polling system capable of urging one or more of the passengers to perform specified actions such as to fasten their seat belts immediately.

The polling system of the invention is preferably combined as a unit with an audio/video system so that the combined system provides improved service and entertainment for its users with a unified and simplified overall system arrangement.

In one embodiment, the invention, includes:
a head end apparatus comprising means for generating a polling command signal and means for centralizing polling answer signals generated in response to the polling command signal, each said polling answer signal including a status signal and an address signal identifying one of the passenger seats;
a plurality of terminal units each provided at a different passenger seat in a passenger vehicle, each said terminal unit comprising a means for decoding said polling command signal, and a means for generating at least one of said polling answer signals; and
a means for transmitting the polling command signal from said head end apparatus to each said terminal unit, and for transmitting each polling answer signal from the terminal unit at which it is generated to the head end apparatus.

In another embodiment, the invention is implemented in a passenger vehicle having a plurality of passenger seats, and comprises:
a head end apparatus comprising means for generating a polling command signal, means for centralizing polling answer signals generated in response to the polling command signal, means for reproducing video programs, means for reproducing audio programs, and means for multiplexing said polling command signal, said video programs, and said audio programs;
a plurality of terminal units each provided at different one of said passenger seats, each said terminal unit comprising a means for receiving said polling command signal, said video programs, and said audio programs, a means for decoding said polling command signal, a means for generating at least one of said polling answer signals in response to said polling command signal, a means for generating an address signal and supplying said address signal to the polling answer signal generating means, a means for selecting desired ones of said video programs and said audio programs and for supplying a signal indicative of the selected ones of the video programs and audio programs to the polling answer signal generating means, a means for sensing the status of one of the passenger seats and supplying a signal indicative of the status of said one of the passenger seats to the polling answer signal generating means, a display means for displaying each selected video program, an audio output terminal for receiving each selected audio program, and a volume control for controlling the volume of each selected audio program received at the audio output terminal; and
a means for transmitting signals between said head end apparatus and said plurality of terminal units.

These and other features and advantages of the invention will become apparent from the following detailed description of the preferred embodiments to be taken in conjunction with the accompanying drawings, throughout which like references identify like elements and parts.

DESCRIPTION OF THE PREFERRED EMBODIMENTS

An embodiment of a polling system according to the present invention will hereinafter be explained with reference to FIG. 1. The embodiment of FIG. 1 is adapted for the transmission of messages, video signals, audio signals, and other signals in an aircraft.

The "transmitting side" (also referred to as the "central control portion" or "central control unit") of invention will first be described with reference to FIG. 1.

Figure 1:
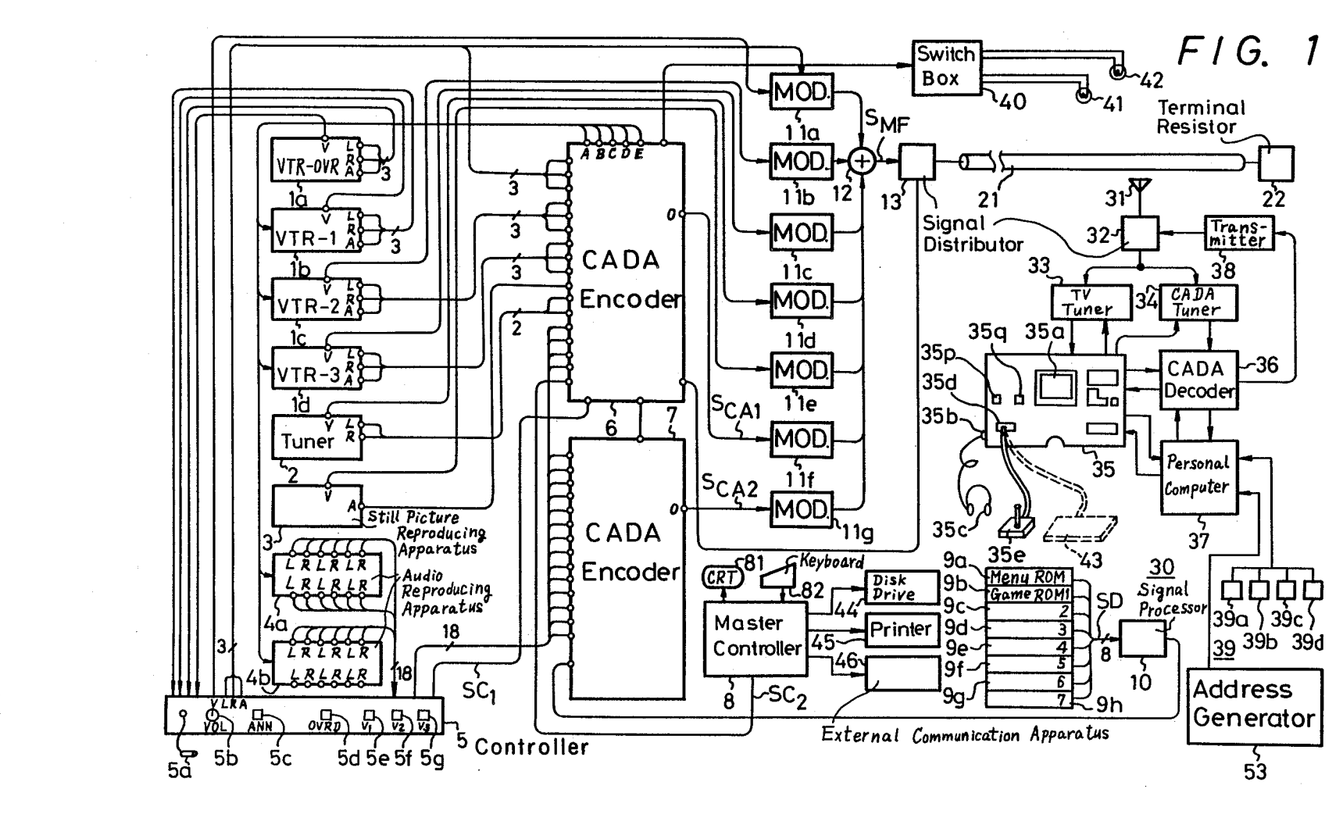
FIG. 1 is a block diagram showing a preferred embodiment of a polling system according to the present invention.

In FIG. 1, reference numerals 1a to 1d designate video tape recorders provided in the transmitting side such as in an aircraft crew's room. Video tape recorder 1a is used for an override operation and may be loaded with a cassette tape explaining how to put on a lifejacket or the like. Each of video tape recorders 1b to 1d is loaded with a cassette tape of a video program such as a movie. Each of video tape recorders 1a to 1d is respectively provided with a terminal V for outputting a reproduced video signal and with terminals L, R and A for outputting reproduced audio signals. In an embodiment in which video tape recorders 1a to 1d store bi-lingual programs, terminals L and R are used for outputting left-channel and right-channel audio signals in a first language, respectively, and terminal A is used for outputting a monaural audio signal in a second language.

Television tuner 2 is provided with a terminal V for outputting a video signal and terminals L and R for outputting the left and right channels of an audio signal, respectively.

Still picture reproducing apparatus 3 is capable of reproducing still picture information recorded in a compact disk (CD) ROM, such as maps, an airport guiding drawing, or the like. The still picture reproducing apparatus 3 is provided with a terminal V for outputting a video signal representative of a still picture and a terminal A for outputting an audio signal associated with the still picture.

Audio reproducing apparatus 4a and audio reproducing apparatus 4b each include three sets of compact disk players (CD players) and tape recorders. The audio reproducing apparatus 4a, 4b are respectively provided with six pairs of terminals L and R for outputting left channel and right channel audio signals.

Controller 5 comprises a microphone 5a, a volume control 5b for adjusting the level of an audio signal received at the microphone 5a, an announce key 5c, an override key 5d and pause keys 5e to 5g for setting the video tape recorders 1b to 1d into pause mode. Video signals from the respective terminals V of the video tape recorders 1a, 1b and audio signals from the respective terminals L, R and A of these recorders are supplied to controller 5. Controller 5 is provided with a terminal V for outputting a video signal and terminals L, R and A for outputting audio signals. Usually, the terminals V, L, R and A of the controller 5 output the video signal supplied from terminal V of the video tape recorder 1b and the audio signals supplied from terminals L, R and A of video tape recorder 1b. However, when the override key 5d is pressed to trigger the override operation, the terminals V, L, R and A of the controller 5 output the video signal supplied from terminal V of video tape recorder 1a and audio signals supplied from terminals L, R and A of video tape recorder 1a. When the announce key 5c is pressed to initiate the announce operation, an audio signal from microphone 5a is delivered to the output terminal A of controller 5.

CADA encoders 6 and 7 are of the type used in the conventional cable digital audio/data transmission system (CADA system) disclosed in U.S. Pat. No. 4,684,981 issued Aug. 4, 1987. The CADA encoders are capable of time-division-multiplexing a plurality of digital audio and data signals and transmitting the multiplexed signals over a vacant one channel band width (6 MHz) of a CATV, thus transmitting signals (e.g., music) with high efficiency without damaging their quality. Each of CADA encoders 6 and 7 is provided with an A/D (analog-to-digital) converter and a shift register. The time-division-multiplexing operation is carried out by converting a plurality of audio signals into digital signals in the A/D converter, inputting the digital signals in parallel to the shift register at predetermined locations, and then outputting the digital signals from the shift register in series at a high speed. Not only digital audio signals but also control data and data comprising computer software can be multiplexed by the CADA encoders in this manner.

The audio signals delivered to the output terminals L, R and A of controller 5 are supplied to encoder 6. The audio signals delivered to the output terminals L, R and A of the video tape recorders 1c and 1d are also supplied to encoder 6. The audio signals delivered to the output terminals L and R of the tuner 2 and the output terminal A of the still picture reproducing apparatus 3 are also supplied to encoder 6. The audio signals delivered to the six pairs of output terminals L and R of audio reproducing apparatus 4a and the six pairs of output terminals L and R of audio reproducing apparatus 4b are supplied to encoders 6 and 7 through controller 5.

When one of the override key 5d, the announce key 5c, and the pause keys 5e to 5g of the controller 5 is pressed, the controller 5 generates control data $SC_1$ having contents corresponding to the pressed key. The control data $SC_1$ is supplied to the encoder 6.

Encoder 6 has output terminals A to E from each of which a pause control signal is outputted in response to the control data $SC_1$. The video tape recorders 1b to 1d and the audio reproducing apparatus 4a and 4b are respectively controlled by the pause signals delivered from the terminals A to E of the encoder 6. More specifically, when the override key 5d and the announce key 5c are pressed, the pause control signal is outputted from all of the terminals A to E, so that the video tape recorders 1b to 1d and the audio reproducing apparatus 4a and 4b all enter a pause mode. When the pause keys 5e to 5g are pressed, pause control signals are outputted from output terminals A to C, placing the video tape recorders 1b to 1d into a pause mode, respectively.

A master controller 8 is provided. Master controller 8 comprises a computer which controls the overall system, and is preferably located in the cabin of the aircraft. Master controller 8 is connected with a display 81 and a keyboard 82. Master controller 8 generates control data $SC_2$ (for controlling one or more terminal apparatus units located in the receiving side of the system) in response to a command from keyboard 82 and supplies control data $SC_2$ to encoder 6. The control data $SC_2$ may be, for example, data for controlling the luminance of a display in the terminal apparatus, data for polling the conditions of each passenger seat at which a terminal apparatus is located, or other data. The data can be monitored by the display 81 connected to the master controller 8.

Menu data is written in ROM 9a, and a different set of game data is written in each of ROMs 9b to 9h. Each data signal SD read out from the ROMs 9a to 9h (for example, for use with computer software) is supplied to a signal processing circuit 10 in which, for example, an error correcting code may be added thereto, and is supplied to encoder 7 thereafter.

Control data signals $SC_1$ and $SC_2$ are supplied also to the encoder 7 from the encoder 6.

A time-division-multiplexed signal $S_{CA1}$ emerges from output terminal 0 of encoder 6. Signal $S_{CA1}$ includes the plurality of digitally converted audio signals generated in encoder 6, and the control data $SC_1$ and $SC_2$ supplied to encoder 6. The signal $S_{CA1}$ is supplied to a modulator 11$f$ to be amplitude-modulated, preferably by a VSB (vestigial sideband) system.

A time-division-multiplexed signal $S_{CA2}$ emerges from an output terminal 0 of the encoder 7. Signal $S_{CA2}$ includes the plurality of digitally converted audio signals generated in encoder 7, and the control data ($SC_1$ and $SC_2$) and the signal SD supplied to encoder 7. The signal $S_{CA2}$ is supplied to modulator 11$g$ to be amplitude-modulated, preferably by a VSB system.

The video signal delivered to the output terminal V of controller 5 is supplied to modulator 11$a$. The audio signal delivered to the terminal A of controller 5 is supplied both to modulator 11$a$ and to encoder 6. In modulator 11$a$, an ordinary television signal is generated by frequency modulating the audio signal and frequency-multiplexing the frequency modulated audio signal with the video signal. This television signal is thereafter amplitude-modulated, preferably by a VSB system.

The video signals delivered to the respective output terminals V of the video tape recorders 1$c$, 1$d$, the tuner 2, and the still picture reproducing apparatus 3 are respectively supplied to modulators 11$b$ to 11$e$ to be amplitude-modulated, preferably by a VSB system.

The modulators 11$a$ to 11$g$ modulate the signals supplied thereto in frequency bands chosen so as to prevent cross modulation, such as in every other channel above the 60 channels of the television broadcasting band.

Output signals from the modulators 11$a$ to 11$g$ are supplied to an adder 12 in which they are frequency-multiplexed. The frequency-multiplexed signal $S_{MF}$ from the adder 12 is supplied through a signal distributor 13 to one end of a leaky cable 21. Cable 21 serves as a bi-directional signal transmission means. The other end of leaky cable 21 terminates at terminal resistor 22. A coaxial cable whose periphery is spirally indented so as to leak a large amount of signals is suitable for use as cable 21.

The receiving side of the system of the invention will next be described.

FIG. 1 shows terminal apparatus unit 30, of the type that preferably will be mounted on the back of each of a plurality of passenger seats in an aircraft. Although only one terminal apparatus unit 30 is illustrated in FIG. 1, preferably there will be the same number of terminal units 30 as there are passenger seats in the aircraft. Each terminal apparatus 30 is provided with an antenna 31 which receives the frequency multiplexed signal $S_{MF}$ leaking from the leaky cable 21. The frequency-multiplexed signal $S_{MF}$ received at the antenna 31 is supplied through a signal distributor 32 to a television tuner 33 and a CADA tuner 34. Tuner 33 is capable of selectively receiving channels in the output frequency bands of the modulators 11$a$ to 11$e$, while the tuner 34 is capable of selectively receiving channels in the output frequency bands of the modulators 11$f$ and 11$g$. Tuners 33 and 34 are controlled in their channel selections by a selection and display apparatus 35.

Video and audio signals emerging from tuner 33 are supplied to the selection and display apparatus 35, and the time-division-multiplexed signal $S_{CA1}$ or $S_{CA2}$ emerging from tuner 34 is supplied to a CADA decoder 36. The CADA decoder 36 is constructed so as to effect substantially the inverse operations to those performed in CADA encoders 6 and 7. More specifically, CADA decoder 36 decodes the time-division-multiplexed signal $S_{CA1}$ (or $S_{CA2}$) or CADA data, produces a desired demultiplexed signal, and supplies the same to selection and display apparatus 35 or personal computer 37. Decoder 36 is provided with a shift register and a D/A converter. The time-division-multiplexed signals $S_{CA1}$ and $S_{CA2}$ are serially input to the shift register. The control data $SC_1$ or $SC_2$ is extracted in parallel form at a predetermined location in the shift register. The desired audio signal and computer software data signal SD are also extracted in parallel form at predetermined locations in the shift register, in response to control signals from selection and display apparatus 35. The audio signal is converted into an analog signal by the D/A converter. Decoder 36 requires a pair of D/A converters for the left channel and right channel of a stereo audio signal. The audio signals emerging from decoder 36 are supplied to selection and display apparatus 35. The computer software data SD is supplied to personal computer 37 and written into a random access memory (RAM) therein. An embodiment of decoder 36 is described in above-referenced U.S. Pat. No. 4,684,981.

A sensor unit 39 is provided to sense the status of each of the passenger seats and the condition of a passenger seated thereon. Sensor unit 39 may include a sensor 39$a$ for sensing whether or not a passenger is seated in the corresponding passenger seat, a sensor 39$b$ for sensing whether a reclinable passenger seat is oriented in a reclining position or an upright position, a sensor 39$c$ for sensing whether or not the passenger has correctly fastened his or her seat belt 60 (shown in FIG. 7), and a sensor 39$d$ for sensing the location of the passenger seat or the like. The sensors 39$a$ to 39$d$ may each include a microswitch, a contactless switch, a pressure switch, a semiconductor strain gauge, a photo sensor, or the like.

Figure 2:
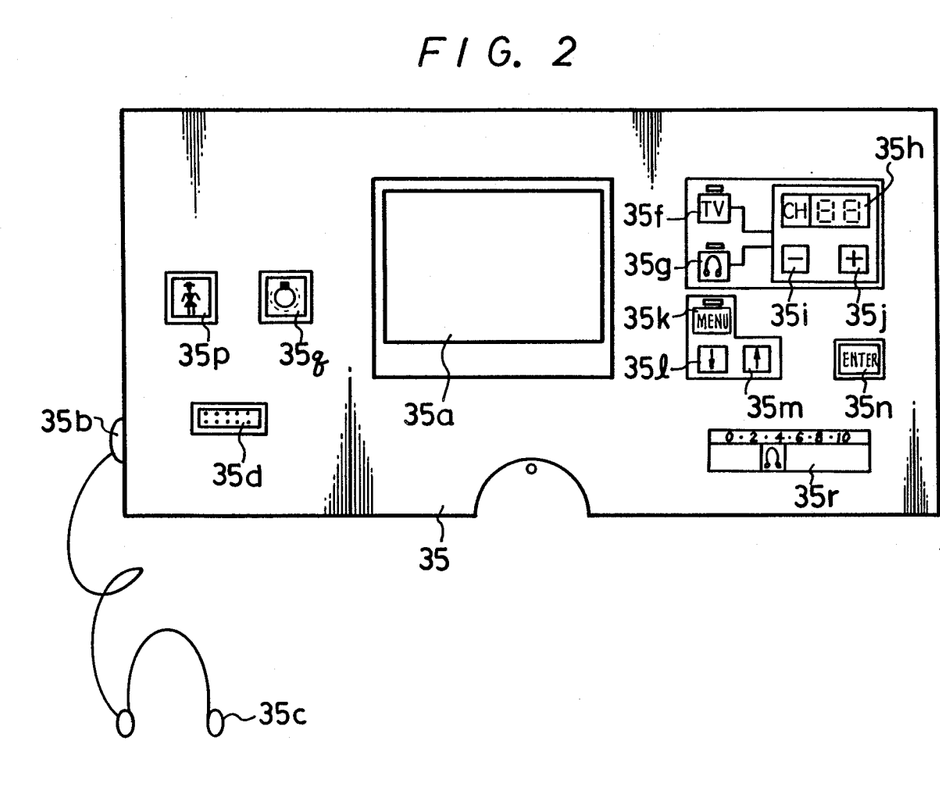
FIG. 2 is an enlarged front view of a front panel of the selection and display apparatus appearing in FIG. 1.
Figure 3:
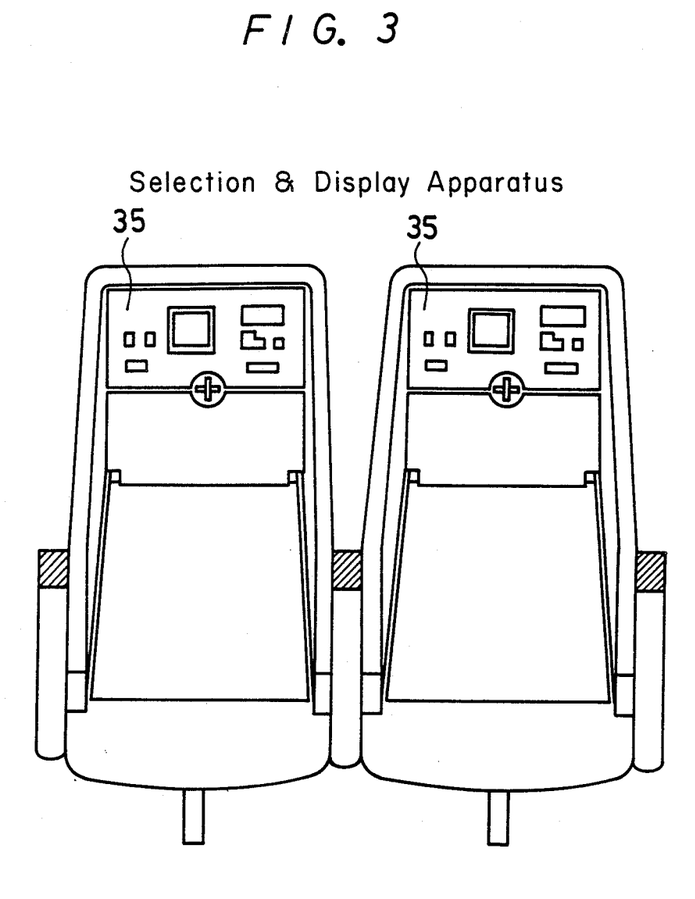
FIG. 3 is a front view of two units of the selection indicating apparatus of the invention, each mounted on the back of a different passenger seat.

FIG. 2 is an example of a preferred arrangement of the panel of selection and display apparatus 35. The panel of selection and display apparatus 35 may be mounted on the back of a passenger seat, as shown in FIG. 3.

FIG. 2 shows a display 35$a$, which may comprise a flat cathode ray tube or an LCD (liquid crystal display) or the like, an audio output terminal 35$b$ for connecting a pair of head phones 35$c$ thereto, and a game terminal 35$d$ for connecting a joy stick 35$e$ (shown in FIG. 1), a keyboard 43 (indicated by dashed lines in FIG. 1), or the like for playing games.

Further, the selection and display apparatus 35 is provided with a television selecting key 35$f$, a music selecting key 35$g$, a channel display 35$h$, a channel-down key 35$i$ and a channel-up key 35$j$.

The television channel can be sequentially changed by first pressing the television selecting key 35$f$ and then pressing the channel-down key 35$i$ or the channel-up key 35$j$. Thus, when the channel received by the television tuner 33 is changed sequentially, the display 35$a$ sequentially displays images reproduced from the video signals derived from the video tape recorders 1$b$ to 1$d$, the tuner 2 and the still picture reproducing apparatus 3, and corresponding audio signals from CADA decoder 36 are outputted to the audio output terminal 35$b$. When the audio signal is bi-lingual, two audio channels are assigned for one video display. A first language is outputted from the first channel; and a second language from the second channel.

The music channel can be sequentially changed by first pressing the music selecting key 35g and then pressing the channel-down key 35i or the channel-up key 35j. In this manner, the audio signal outputted from the CADA decoder 36 is changed, and the audio signals outputted from the audio reproducing apparatus 4a and 4b are sequentially outputted to the audio signal output terminal 35b.

The selection and display apparatus 35 is also provided with a menu display key 35k, a cursor-down key 35l, a cursor-up key 35m and an enter key 35n. By pressing the menu key 35k, a video signal based on data from the menu ROM 9a is supplied to the selection and display apparatus 35 from the personal computer 37 and a menu is displayed on the display 35a.

By pressing the enter key 35n after selecting a game by moving the cursor on the display with the cursor-down key 35l and the cursor-up key 35m, a video signal and an audio signal based on data of the selected game from the game ROMs 9b to 9h are supplied from the personal computer 37 to the selection and display apparatus 35. Then, the game is displayed on the display 35a and the game sound signal is outputted to the audio output terminal 35b.

Selection and display apparatus 35 also includes an attendant call key 35p, a reading light key 35q and a volume control 35r.

Selection and display apparatus 35 (also referred to herein as "selection indicating apparatus 35") is controlled by a CPU (not shown) in CADA decoder 36 on the basis of the control data $SC_1$, $SC_2$ extracted by CADA decoder 36.

If override key 5d of controller 5 is pressed to initiate an override operation while passengers are watching a movie on the display 35a or listening to music, tuner 33 is forced to receive the frequency channel having the output frequency band of modulator 11a, display 35a of selection indicating apparatus 35 is forced to display an image reproduced from the video signal outputted to terminal V of video tape recorder 1a, and audio output terminal 35b is forced to output the audio signal supplied to output terminal A of video tape recorder 1a.

When announce key 5c of controller 5 is pressed to initiate an announce operation, tuner 33 is forced to receive the frequency channel having the output frequency band of modulator 11a, and audio output terminal 35b is forced to output the audio signal from microphone 5a. In this event, the video signal is muted so that display 35a does not display any image. Further, any one of the television selecting key 35f, the music selecting key 35g, the channel-down key 35i, the channel-up key 35j and the volume adjuster 35r, or all of them are disabled (prohibited from operating). Additionally, the volume to all terminal units may be caused to be uniform.

When CADA encoder 6 or 7 ceases to function, due to a malfunction for example, the control data $SC_1$ supplied to selection indicating apparatus 35 is the same as that indication initiation of an override operation, so that the selection indicating apparatus 35 is forced into the same mode of operation as in the override mode.

When an override operation is effected while a passenger is playing a game on terminal display 35a, personal computer 37 is temporarily prohibited from executing the game. Also in this case, all or some of the functions of unit 35 may be disabled, such as channel selection and volume adjustment by television selecting key 35f, music selecting key 35g and so on.

When the override key 5d or the announce key 5c is pressed again to terminate the override operation or the announce operation, selection and display apparatus 35 is released from the override condition and automatically returned to its condition as of initiation of the override or announce operation. More specifically, video tape recorders 1b-1d and audio reproducers 4a and 4b are automatically released from the pause state and set into the reproducing mode. The terminal units 30 are also returned to their selected conditions as of the initiation of the override or announce operation, so that reproduction of the video signal and the audio signal resumes from the respective interrupted points. Thus, the passengers can view a complete movie or listen to musical program without missing any scene of the movie or any part of the music. if the override or announcement operation had interrupted a game, personal computer 37 resumes its execution, so that play of the game may resume.

When the selection state is overridden (forced into a condition) as described above, channel display 35h displays a signal indicative of the forced condition. Selection and display apparatus 35 may optionally include an additional display may for this indication.

The brightness of display 35a is automatically controlled in response to appropriate control data $SC_2$, for example, in such a manner that the brightness of display 35a corresponds with the brightness of the cabin.

When master control unit 8 generates control data $SC_2$ requesting transmission of data from one or more units 35 (i.e., a "polling command signal"), such as data indicative of which video signal, audio signal, or television game software has been selected by such unit or units, the CPU within the CADA decoder 36 of each relevant unit 35 generates the requested data, which may be indicative of which of keys 35f, 35g, and 35k is actuated, and which channel has been selected (when key 35f or 35g is actuated) or which television game has been selected (when key 35k is actuated). The requested data is supplied to transmitter 38, together with address data from address generator 53, to be modulated to a frequency outside the frequency bands of modulators 11a through 11g. Then, the modulated data is supplied through signal distributor 32 and antenna 31 to leaky cable 21. The data is next supplied from leaky cable 21 through signal distributor 13 to CADA encoder 6 from which the data is supplied to master controller 8 to be utilized, for example to calculate an audience rating, or a utilization rating.

The signals indicative of the "selection status" of each terminal unit (i.e., the data described in the preceding paragraph) may be monitored on monitor 81.

If control data $SC_2$ is a polling command signal that requests information on the status of each passenger seat, the CPU (not shown) within each CADA decoder 36 produces the requested data, which may be indicative of the status of each seat belt, or of the reclining state of each passenger seat as sensed by sensor 39. This data is supplied to the head end apparatus in the same manner (described in the two preceding paragraphs) as is the data indicative of the selection status of the terminal units for processing and monitoring in the head end apparatus.

Figure 7:
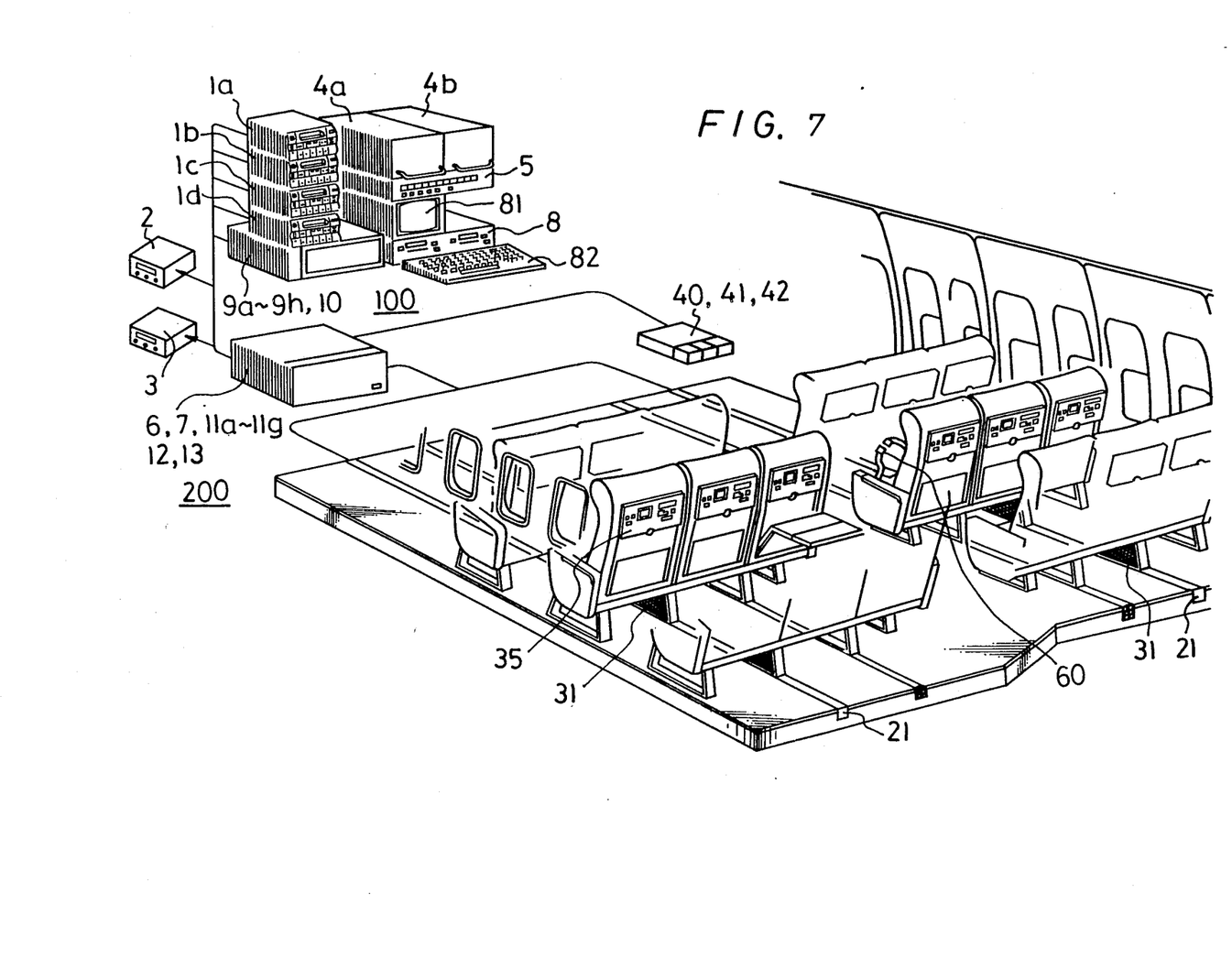
FIG. 7 is a perspective view of a preferred embodiment of the invention.

If sensor 39 detects that the passenger on a certain passenger seat has not fastened his or her seat belt 60

(shown in FIG. 7), and this information is transmitted to the head end apparatus, an announcement from microphone 5a or a signal reproduced by VTR 1a may be transmitted only to that passenger as a message by which that passenger is urged to fasten his or her seat belt 60.

In an embodiment in which each terminal apparatus 30 (except for antenna 31, headphone 35c, and joystick 35e) is embedded into the back of a passenger seat, each selection and display apparatus 35 is provided at the rear side of one of the seats. In this embodiment each selection and display apparatus 35 mounted in a seat in the first row is used by a passenger seated in the second row. However, sensor 39 connected with a terminal apparatus 30 mounted in a passenger seat in the first row may sense the condition of a passenger seat located in the first row. Thus, the passenger seat sensed by sensor 39 and the passenger using the terminal unit connected to the sensor need not correspond.

Accordingly, when the detected output from sensor 39 is transmitted through terminal apparatus 30 to the head end apparatus, any incorrect passenger seat number may be corrected by the terminal apparatus 30, and the corrected passenger seat number and the detected output from the sensor 39 may then be transmitted to the head end apparatus. Alternatively, any incorrect passenger seat number may be corrected by master controller 8.

Since, as described above, the status of each passenger seat or the condition of the passenger on that seat may be detected and the detected output transmitted to the head end apparatus, it is not necessary for a passenger attendant to move through the cabin to check the status of each passenger seat and the condition of each passenger in the cabin, for example, when the aircraft is taking off or landing. Thus, the attendant's work can be alleviated considerably. Further, since the status of each passenger seat can be quickly checked by entry of an appropriate command on keyboard 82, the attendant can urge individual passengers to obey specific instructions, such as to fasten seat belt 60 (see FIG. 7) for reasons of safety.

When attendant call key 35p on selection indicating apparatus 35 is pressed, control data is generated from the CPU in the associated CADA decoder 36. This control data is supplied to transmitter 38 to be modulated and is thereafter supplied through signal distributor 32 and antenna 31 to leaky cable 21. Then, the data is supplied from leaky cable 21 through signal distributor 13 to CADA encoder 6. A CPU (not shown) within CADA encoder 6 controls a switching box 40 on the basis of the data received from cable 21 so as to light the corresponding attendant call lamp 41.

When reading light key 35q on selection indicating apparatus 35 is pressed, control data is generated from the CPU in the associated CADA decoder 36. This control data is supplied to transmitter 38 to be modulated and thereafter supplied through signal distributor 32 and antenna 31 to leaky cable 21. Then, the data is supplied from leaky cable 21 through signal distributor 13 to CADA encoder 6. The CPU within CADA encoder 6 controls switching box 40 on the basis of the data received from cable 21 so as to turn on or off a corresponding reading lamp 42.

When keyboard 43 is connected to game terminal 35d, as shown by dashed lines in FIG. 1, the CPU in the CADA decoder 36 generates control data. This control data is supplied to transmitter 38 to be modulated and thereafter supplied through signal distributor 32 and antenna 31 to leaky cable 21. The data is next supplied from leaky cable 21 through signal distributor 13 to CADA encoder 6 from which the data is supplied to master controller 8. In response thereto, master controller 8 supplies encoders 6 and 7 with a computer program such as a word processor program. The program (which will hereinafter be referred to as a word processor program for specificity) is supplied through leaky cable 21 to terminal apparatus 30 as a frequency-multiplexed signal and is received by personal computer 37. When a passenger inputs sentences or the like from the keyboard 43, the sentences or the like are stored in a random access memory (RAM) in personal computer 37. Display 35a displays the inputted sentences or the like so that the passenger using the word processor can correct the sentences or the like while viewing them on display 35a. When an instruction indicating the termination of a word processing operation is entered using keyboard 43, data representing the sentences or the like (converted into ASCII code) stored in the RAM of personal computer 37 are supplied through CADA decoder 36 to transmitter 38 to be modulated and thereafter are supplied to leaky cable 21 through signal distributor 32 and antenna 31. Then, the data is supplied from leaky cable 21 through signal distributor 13 to CADA encoder 6 from which the data is supplied to master controller 8. The data representing the sentences or the like may be supplied from master controller 8 to disk drive 44 to be recorded e.g. in a floppy disk. Otherwise, the data is supplied to printer 45 which prints the sentences or the like, or to transmitter 46 to be transmitted to a remote location. The destination of the word processing data is selected by the user by entry of appropriate commands on keyboard 43. Data indicative of the selected destination is supplied to master controller 8 together with the word processing data itself. The word processor program may be previously written in the ROM provided in the personal computer 37 and then utilized. Any record generated at memory unit 44 and any printed record generated at printer 45 may be delivered to the passenger, such as when the passenger exits the aircraft.

According to the FIG. 1 embodiment, video signals from video tape recorders 1a to 1d, tuner 2 and still picture reproducing apparatus 3, and audio signals from video tape recorders 1a to 1d, tuner 2, still picture reproducing apparatus 3 and the audio reproducing apparatus units 4a and 4b are time-division-multiplexed by the CADA encoders 6 and 7 which produce the output signals $S_{CA1}$ and $S_{CA2}$. These output signals $S_{CA1}$ and $S_{CA2}$ from the CADA encoders 6 and 7 are modulated by modulators 11f and 11g, and added together (and added to signals from modulators 11a through 11e) to form the frequency-multiplexed signal $S_{MF}$. This frequency-multiplexed signal $S_{MF}$ is supplied to leaky cable 21, by which it is transmitted to the system's reception side. Each terminal unit 30 at the reception side can select desired signals from the plurality of video, audio, and other signals transmitted as components of the frequency-multiplexed signal $S_{MF}$ by operation of selection and display apparatus 35.

Data indicative of actuation of reading light key 35q and attendant call key 35p is produced at each terminal unit 30 and is supplied to transmitter 38, in which it is modulated. The modulated data therefrom is supplied through signal distributor 32 and antenna 31 to leaky cable 21. The data from leaky cable 21 is supplied through signal distributor 13 to a CPU (not shown) within CADA encoder 6, so that the data may be used to generate signals for controlling reading lamp 42 and the attendant call lamp 41.

Control data $SC_2$ produced in master controller 8 (which may be a polling command signal directed to one or more of terminal units 30) are multiplexed with the audio signals by the CADA encoders 6 and 7 and then fed through leaky cable 21 to the terminal units 30 at the reception side. In accordance with the control data $SC_2$, the CPU (not shown) within each CADA decoder 36 produces polling answer data, which may be detected by sensor 39, and which may be indicative of the status of the keys of the relevant selection and display apparatus 35 and indicative of the status of the seat belt 60, the orientation and location of the passenger seat, and so on. This polling answer data is modulated by transmitter 38 and then supplied through signal distributor 32 and antenna 31 to leaky cable 21. The data comprising the signal from leaky cable 21 is supplied through signal distributor 13 to CADA encoder 6 for encoding, and the data encoded by CADA encoder 6 is supplied to master controller 8, in which it may be utilized to calculate an audience rating and so on.

Next, another preferred embodiment of a message delivery system according to the present invention will be described with reference to FIG. 4. The FIG. 4 system is constructed so as to be able to individually poll each of the plurality of terminal units 30. The components in FIG. 4 corresponding to those in FIG. 1 are designated by the same reference numerals and the explanation thereof will be omitted.

Figure 4:
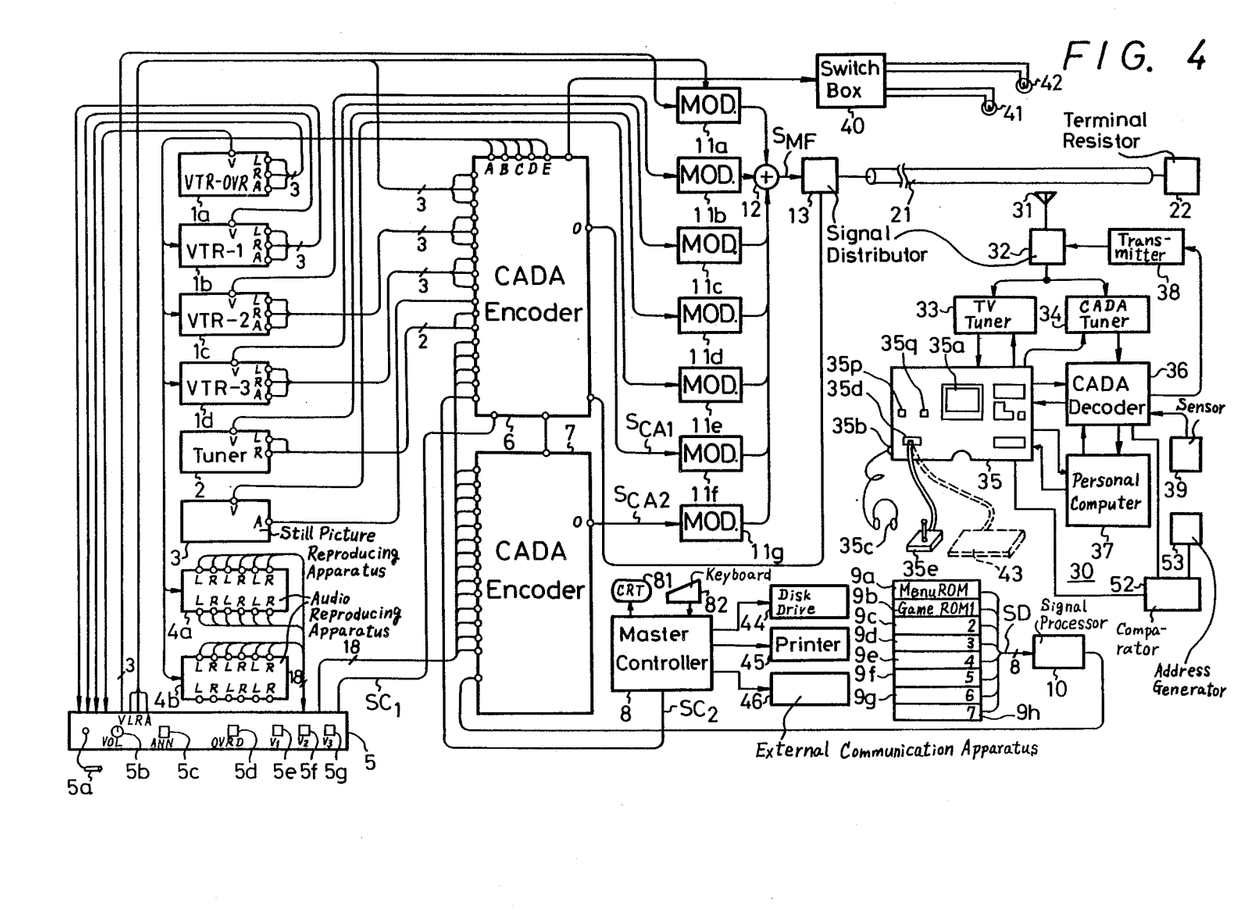
FIG. 4 is a block diagram of another preferred embodiment of the invention.

In the FIG. 4 embodiment, master controller 8 generates an address signal corresponding to the terminal unit 30 to be polled by operating keyboard 82. This address signal and the control data $SC_2$ are supplied to CADA encoder 6 and are multiplexed with the control data $SC_1$ therein. Then, the control data $SC_1$ and $SC_2$ and the address signal are supplied to leaky cable 21 to be transmitted to the receiving side of the system.

The CADA decoder 36 in each terminal unit 30 extracts the address signal from the signals $S_{CA1}$, $S_{CA2}$ which are supplied from CADA tuner 34. The address signal extracted by each CADA decoder 36 is supplied to a comparator 52 wherein the extracted address signal is compared with an address signal, generated from an address generator 53 including a read-only memory (ROM) or the like provided in each terminal unit 30. The CPU of CADA decoder 36 is controlled by an output signal from comparator 52. Only when the address signal extracted by the decoder 36 coincides with the address signal from the address generator 53, will CADA decoder 36 supply a polling answer signal, which may be indicative of the key operation of selection and display unit 35 and of the status of the passenger seat, to transmitter 38 for transmission to the transmitting side as set forth above.

The rest of the FIG. 4 embodiment is constructed and arranged in the same manner as is the FIG. 1 embodiment.

In the FIG. 4 embodiment, each terminal unit 30 corresponding to a terminal address signal transmitted from the transmitting side is polled, and the other terminal units do not transmit polling answer signals to the head end apparatus. By sequentially changing the terminal address signal supplied from the transmitting side, the terminal units may be sequentially polled.

Next, signal formats of the signals $S_{CA1}$ and $S_{CA2}$ will be explained with reference to FIGS. 5A–5C. The signal format is improved from that disclosed in aforementioned U.S. Pat. No. 4,684,981.

Figure 5A:
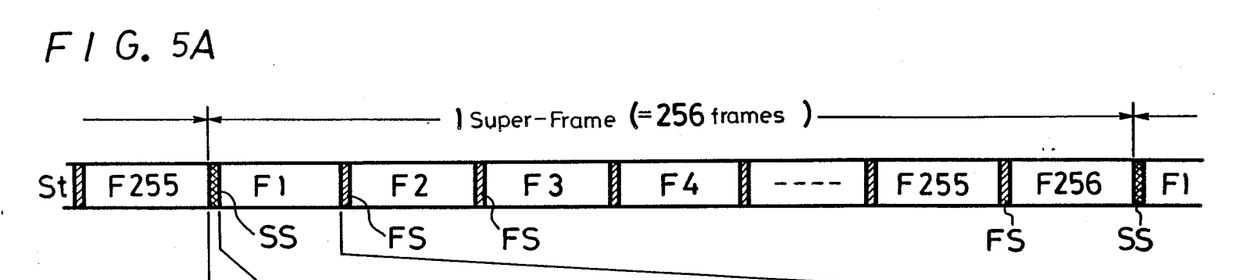
FIGS. 5A-5C and 6A-6D are diagrams showing signal formats used in the invention.
Figure 5B:
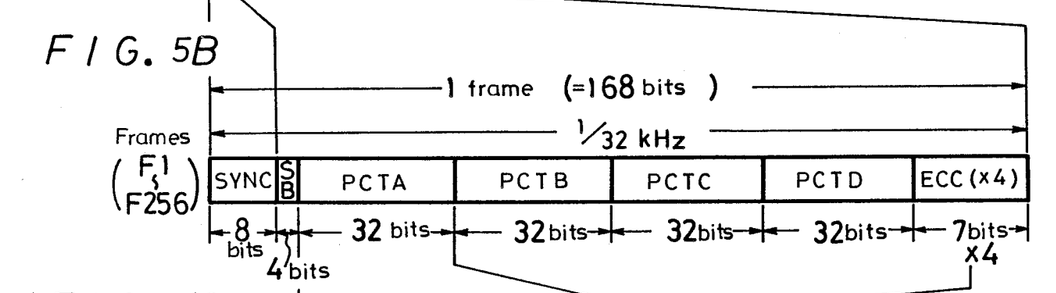

Multiplexed signal St shown in FIG. 5A, is a serial binary signal formed of a number of super-frames. One super-frame thereof is formed of 256 frames F1 through F256. As shown in FIG. 5B, each frame includes 168 bits and the cyclic period of one frame is $(32 \text{ kHz})^{-1}$. Each frame has an 8-bit synchronizing code SYNC, followed by a 4-bit service bit SB, followed by four 32-bit data packets PCTA - PCTD, followed by four 7-bit error correcting codes (ECCs).

There are two kinds of synchronizing code SYNC as shown in FIG. 5A: a super-frame-sync SS for the frame F1 at the head of the super-frame and a frame-sync FS for the subsequent 255 frames F2–F256. The bit patterns of super-frame-sync SS and frame-sync FS are selected to differ from each other.

The service bits SB, the details of which will be provided below, are grouped into four groups each including 77 bits. Each service bit contains data such as a command, a seat number, and so on.

Each of data packets PCTA - PCTD is formed of 32 bits and is independent of the others. As shown in FIG. 5C, each of the packets PCTA - PCTD is divided into four channels M1–M4, each being formed of 8 bits. Each of the channels M1–M4 contains a PCM signal obtained by sampling the audio signals L, R and A at a frequency of 32 kHz.

Since one frame contains four packets PCTA - PCTD and each packet has four channels M1–M4, 16-channel audio signals can be simultaneously transmitted in time-division multiplexed form by the use of one signal St. Each channel is sampled at a sampling frequency of 32 kHz and encoded in 8 bits, so that it complies with the PCM audio standard of an 8 mm video tape recorder (VTR).

Data signals from the ROMs $9a$–$9h$ are converted into a time-division multiplexed bit sequence signal by signal processing circuit 10 (shown in FIG. 4). The time-division multiplexed signal emerging from circuit 10 is used as one channel of the 16-channel signals. The signal emerging from circuit 10 is cyclic, so that when the last bit of data from ROMs $9a$–$9h$ is transmitted, the first bit of the data from these ROM's is retransmitted.

Figure 5C:
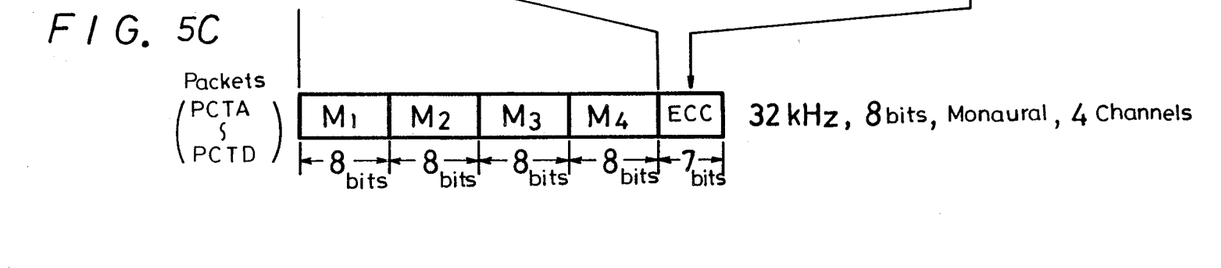

Each channel of the FIG. 5C signal is formed of eight bits, and eight ROMs $9a$–$9h$ are provided. Accordingly, in the channel for transmitting data from the ROMs $9a$–$9h$, each of the first bit through the eighth bit of the channel corresponds to data from a different one of ROMs $9a$ through ROM $9h$. Therefore, the transmission rate of data from each ROM is 32 kbps.

The four error correcting codes ECCs respectively correct errors which may occur in the packets PCTA - PCTD.

Since the signal St has format determined as described above, the bit transmission rate thereof is calculated as follows:

$$168 \text{ bits} \times 32 \text{ kHz} \approx 5.4 \text{ Mbps}.$$

One half of the calculated value is the Nyquist frequency, so that the signal St can be transmitted in a video signal bandwidth.

As described above, each of the encoders 6 and 7 can time-division-multiplex sixteen channels of audio signals, and the time division-multiplexed signal can be frequency-multiplexed with other video signals.

Figure 6A:
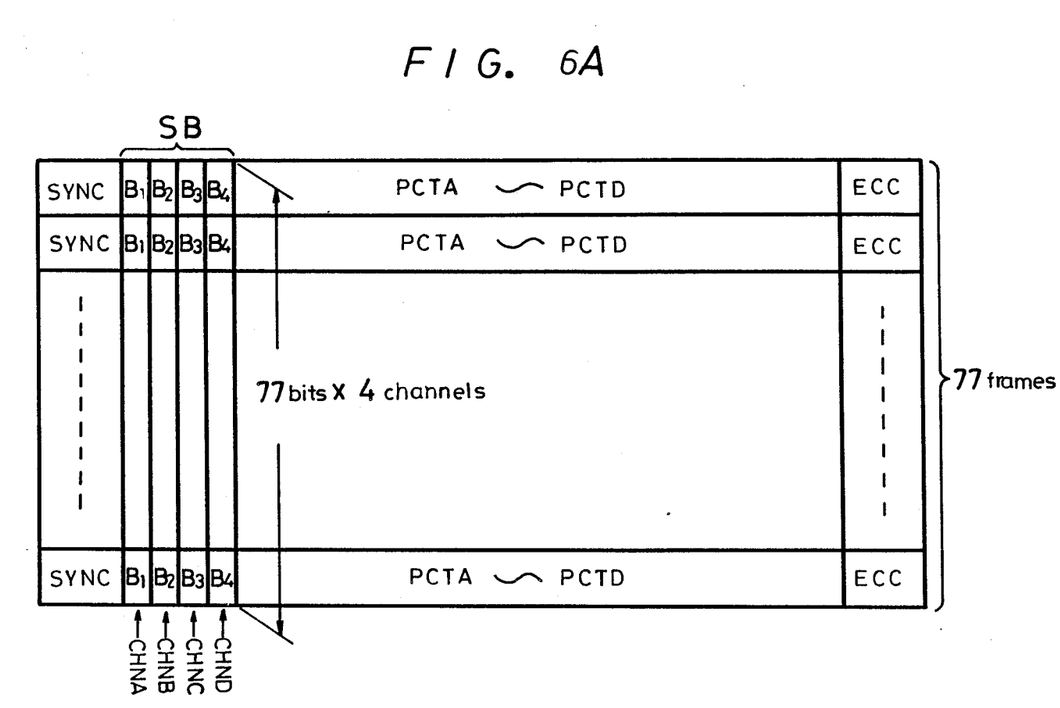

The service bits SB are preferably used in groups having a format as shown in FIGS. 6A–6D. To be specific, four service bits SB are provided for every frame, and may be designated $B_1$–$B_4$. Assuming that continuous 77 frames are vertically aligned as one group, as schematically shown in FIG. 6A, the service bits SB for this group have a dimension of vertical 77 bits x horizontal 4 bits.

Figure 6B:
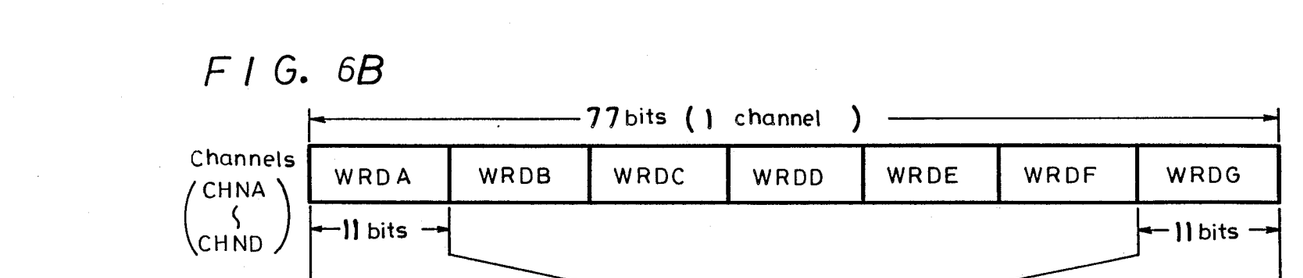

As shown in FIG. 6B, the service bits SB may be vertically grouped so that each set of 77 bits is designated as one channel. A first such channel CHNA includes 77 bits $B_1$ and second - fourth such channels CHNB - CHND include bits $B_2s$–$B_4s$, respectively.

Figure 6C:
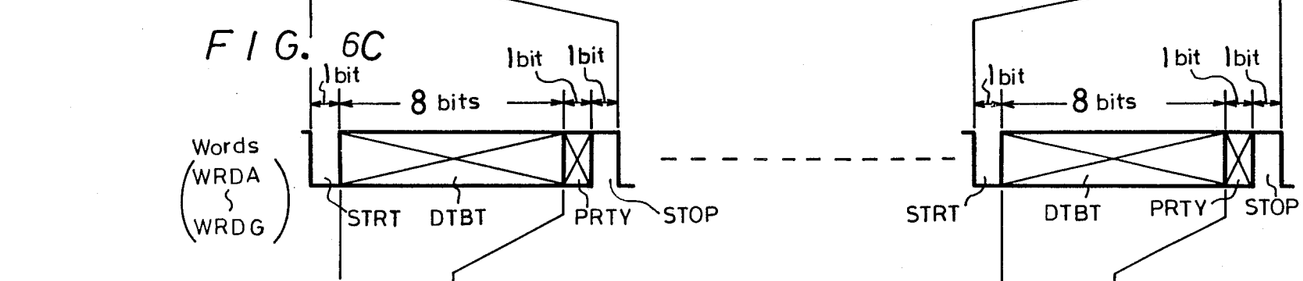

Each of the channels CHNA - CHND is divided into seven words WRDA - WRDG, each being formed of 11 bits as shown in FIG. 6B. Each word has its first bit set to "0" level and used as a start bit STRT, the subsequent eight bits are used as data bits DTBT, the next one bit used as a parity bit PRTY, and the last one bit determined to be "0" level and used as a stop bit STOP, as shown in FIG. 6C.

There is one data bit DTBT for each word in each of the channels CHNA-CHND, and there are seven words for each 77 frames. Therefore, there are seven data bits (seven bytes) for the 77 frames. Accordingly, there are 7 bytes ×4 channels of the data bits DTBTs in all.

Figure 6D:
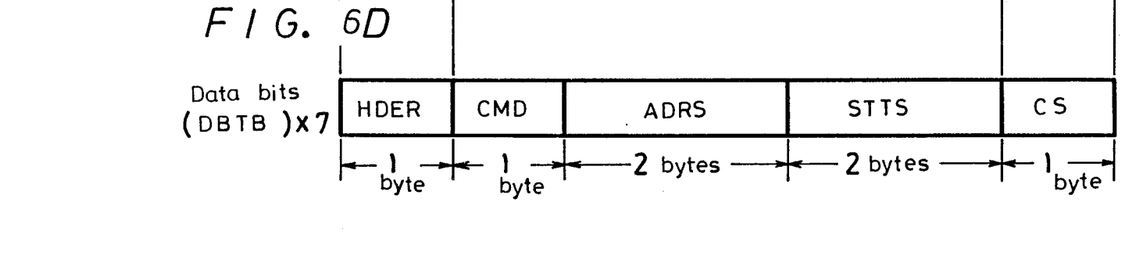

The second channel CHNB has its first byte set in a predetermined bit pattern ("AA" in hexadecimal) and is used as a header HDER, its second byte is used as a command CMD for identifying a maximum of 256 kinds of commands, the third and fourth bytes are used as an address ADRS indicative of a seat number (or a number of identifying a particular terminal unit), the fifth and sixth bytes are used as status information STTS indicative of data or parameters incident to the command CMD, and the last byte used as a check sum CS.

The command CMD of FIG. 6D represents control data $SC_1$ or $SC_2$ from controller 5 and master controller 8. For example, when a terminal unit is forced into the message receiving state, the control data $SC_2$ for this operation is generated from master controller 8 by operating center keyboard 82 and is transmitted as a command CMD of a signal having FIG. 6D format.

The address ADRS is arbitrarily changed by the operation of center keyboard 82, so that any of or all of the terminal units may be specified.

FIG. 7 shows a preferred embodiment of the invention which is installed in a cabin of an aircraft. The components in FIG. 7 corresponding to those in FIGS. 1 and 4 are designated by the same reference numerals. Disk drive 44, printer 45 and external communication apparatus 46 are omitted in FIG. 7 for simplicity. ROMs 9a–9h and signal processing circuit 10 in FIGS. 1 and 4 are accommodated in box 100, and CADA encoders 6 and 7, modulators 11a–11g, adder 12 and signal distributor 3 are accommodated in box 200.

The above embodiments have been described for the case where the invention is embodied in an aircraft. The invention may also be implemented in a passenger vehicle such as a train, a bus or the like.

In the above-described embodiments, each selection and display apparatus 35 is arranged on the back of a passenger seat. Alternatively, each unit 35 can be mounted at the vicinity of the seat, for example, on the arm portion of the seat, on a table attached to the seat or the like.

According to the present invention, since polling answer signals (which may indicate the status of each of the passenger seats or the condition of each passenger seated thereon) are generated at the individual terminal units and are then centralized (i.e., received, and either displayed or processed) at the head end apparatus, the attendant need not walk through the passenger vehicle to check each passenger seat, for example, when an aircraft is taking off or landing. Thus, the labor of the attendant can be considerably alleviated. Further, the status of each passenger seat can quickly be checked by actuating keys of a keyboard at a head end apparatus, and it is possible to urge individual passengers to take proper actions such as to fasten a seat belt, or the like.

Further, since the selection status of each terminal unit can be checked, the popularity of each video program, music program and television game software available to the passengers can be determined. Thus, the popular programs and games may be used continuously, and unpopular ones replaced with other ones so that service can be improved.

Furthermore, since the polling system of the present invention is integrally formed as a single combined unit with a system for providing audio and video signals to passengers, the combined system provides expanded service with a simplified overall system arrangement.

Although several preferred embodiments of the invention have been described, it will be apparent that many modifications and variations on the described embodiments could be effected by one skilled in the art without departing from the spirit or scope of the invention, as claimed below.

We claim as our invention:

1. A passenger vehicle polling system, including:
    a head end apparatus comprising means for generating a polling command signal and means for centralizing polling answer signals generated in response to the polling command signal, each one of said polling answer signals including a status signal and an address signal identifying one of the passenger seats;
    a plurality of terminal units each provided at a different one of the passenger seats, each of said terminal units comprising a means for decoding said polling command signal, and a means for generating said each polling answer signal; and
    a means for transmitting the polling command signal from the head end apparatus to the terminal units, and a means for transmitting said each polling answer signal from said one of the terminal units at which it is generated to the head end apparatus.

2. A polling system according to claim 1, in which said each terminal unit comprises a sensor means capable of sensing the status of a respective one of the passenger seats and sending said status signal indicative of said sensed status to the polling answer signal generating means.

3. A polling system according to claim 2, in which each said passenger seat comprises a seat belt, and each said sensor means senses the status of the seat belt of the corresponding one of the passenger seats.

4. A polling system according to claim 2, in which each said passenger seat may be placed in a reclining position, and each said sensor means senses whether the corresponding one of the passenger seats is in a reclining position.

5. A polling system according to claim 2, in which each said sensor means senses whether the corresponding one of the passenger seats is occupied.

6. A polling system according to claim 1, in which said head end apparatus further comprises a means for reproducing video programs, a means for reproducing audio programs, and a means for multiplexing said polling command signal, said video programs and said audio programs, and each said terminal unit further comprises a means for receiving said video programs and said audio programs, a channel selecting means for selecting among said video programs and said audio programs, said channel selecting means having a key means and a means for sending a signal indicative of the status of the key means to the polling answer signal generating means, a means for displaying the selected said video programs, and an audio output terminal for receiving the selected audio programs, wherein at least one of said polling answer signals is concerned with the status of the key means of one of the channel selecting means.

7. A polling system according to claim 6, in which said head end apparatus further comprises a memory means for storing television game software signals, wherein said multiplexing means is capable of multiplexing the television game software signals with the polling command signal, the video programs and the audio programs, and wherein each said terminal unit further comprises a game selecting means for selecting desired ones of said television game software signals, said game selecting means having key means and a means for sending a signal indicative of the status of the key means to said polling answer signal generating means, wherein at least one of said polling answer signals is concerned with the status of the key means of one of the game selecting means.

8. A polling system according to claim 6, in which each said terminal unit includes a panel, and said key means, said display means, and said audio output terminal are provided on the panel.

9. A polling system according to claim 8, in which each said panel is mounted on the rear side of a different one of the passenger seats.

10. A polling system according to claim 1, in which said head end apparatus further comprises a monitor means for displaying the polling answer signals received from the terminal units.

11. A polling system according to claim 10, in which said head end apparatus further comprises a keyboard means connected to said polling command signal generating means, and in which the polling command signal is generated in response to actuation of the keyboard means.

12. A polling system according to claim 11, in which said head end apparatus is capable of generating terminal address signals and including said terminal address signals as part of said polling command signal, each said terminal unit further comprises means for comparing said terminal address signals with said address signal, and wherein said polling answer signal generating means generates one of said polling answer signals when said address signal is coincident with one of said terminal address signals.

13. A passenger vehicle polling system, comprising:
a head end apparatus comprising means for generating a polling command signal, means for centralizing polling answer signals generated in response to the polling command signals, means for reproducing video programs, means for reproducing audio programs, and means for multiplexing said polling command signal, said video programs and said audio programs to form a multiplexed signal to be transmitted;
a plurality of terminal units each provided at a different one of a plurality of passenger seats, each said terminal unit comprising a means for receiving said multiplexed signal, a means for decoding said polling command signal, a means for generating at least one of said polling answer signals in response to said polling command signal, a means for generating an address signal identifying one of the passenger seats and for supplying the address signal to said polling answer signal generating means, a means for selecting desired ones of said video programs and said audio programs and for supplying a signal indicative of the selected ones of the video programs and audio programs to the polling answer signal generating means, a means for sensing the status of one of the passenger seats and for supplying a signal indicative of the status of said one of the passenger seats to said polling answer signal generating means, a display means for displaying the selected video programs, and an audio output terminal for receiving the selected audio programs; and
a means for transmitting signals between said head end apparatus and said plurality of terminal units.

14. A passenger vehicle polling system according to claim 13, in which the head end apparatus further comprises a memory means for storing television game software signals, wherein the multiplexer means is capable of multiplexing the television game software signals with said polling command signal, said video programs and said audio programs, and said each terminal unit further comprises a means for receiving and selecting desired ones of the television game software signals, a means for supplying to the polling answer signal generating means a signal indicative of the selected ones of the television game software signals, and a means for processing the selected television game software signals.

15. A polling system according to claim 14, in which said signal transmitting means is a cable.

16. A polling system according to claim 15, in which said passenger vehicle is an aircraft.

17. A passenger vehicle polling method, including the steps of:
generating a polling command signal at a head end apparatus in a passenger vehicle;
transmitting the polling command signal from the head end apparatus to each of a plurality of terminal units, each of said terminal units located at a different one of a plurality of passenger seats in the passenger vehicle;
at said each terminal unit, decoding said polling command signal and generating in response to the decoded polling command signal a polling answer signal including an address signal identifying one of the passenger seats and a status signal indicative of the status of said one of the passenger seats; and
transmitting each said polling answer signal to the head end apparatus.

18. A polling method according to claim 17, in which each of said passenger seats comprises a seat belt, and including the step of:

at said each terminal unit, sensing the status of one of said seat belts, and generating said status signal in a manner so that said status signal is indicative of the sensed seat belt status.

19. A polling method according to claim 17, in which each of said passenger seats is capable of reclining, and also including the step of:

at said each terminal unit, sensing whether one of said passenger seats is reclining, and generating said status signal in a manner so that said status signal is indicative of the sensed seat status.

20. A polling method according to claim 17, also including the steps of:

at said each terminal unit, sensing whether one of said passenger seats is occupied, and generating said status signal in a manner so that said status signal is indicative of the sensed seat status.

21. A polling method according to claim 17, also including the steps of:

at the head end apparatus, reproducing video programs, reproducing audio programs, and generating a multiplexed signal including said polling command signal, said video programs, and said audio programs;

transmitting the multiplexed signal from the head end apparatus to said each terminal unit; and at said each terminal unit, receiving the multiplexed signal, selecting desired ones of said video programs and said audio programs, and generating said status signal in a manner so that said status signal indicates which of the video programs and audio programs has been selected.

22. A polling method according to claim 21, also including the steps of:

at the head end apparatus, storing television game software signals, and generating the multiplexed signal by multiplexing said television game software signals with said video programs and said audio programs so that the multiplexed signal includes the polling command signal, the video programs, the audio programs, and the television game software signals; and at said each terminal unit, selecting desired ones of the television game software signals, and generating said status signal in a manner so that said status signal indicates which of the video programs, audio programs, and television game software signals has been selected.

23. A polling system according to claim 17, also including the steps of:

at the head end apparatus, generating terminal address signals and transmitting said terminal address signals as part of said polling command signal; and at said each terminal unit, generating an address signal, comparing said terminal address signals with the address signal, and generating said polling answer signal when said address signal coincides with one of said terminal address signals.

* * * * *